Feb. 5, 1946.  A. A. SCUSE  2,394,209
SPEED CONTROL FOR MACHINE TOOLS
Filed Aug. 6, 1942
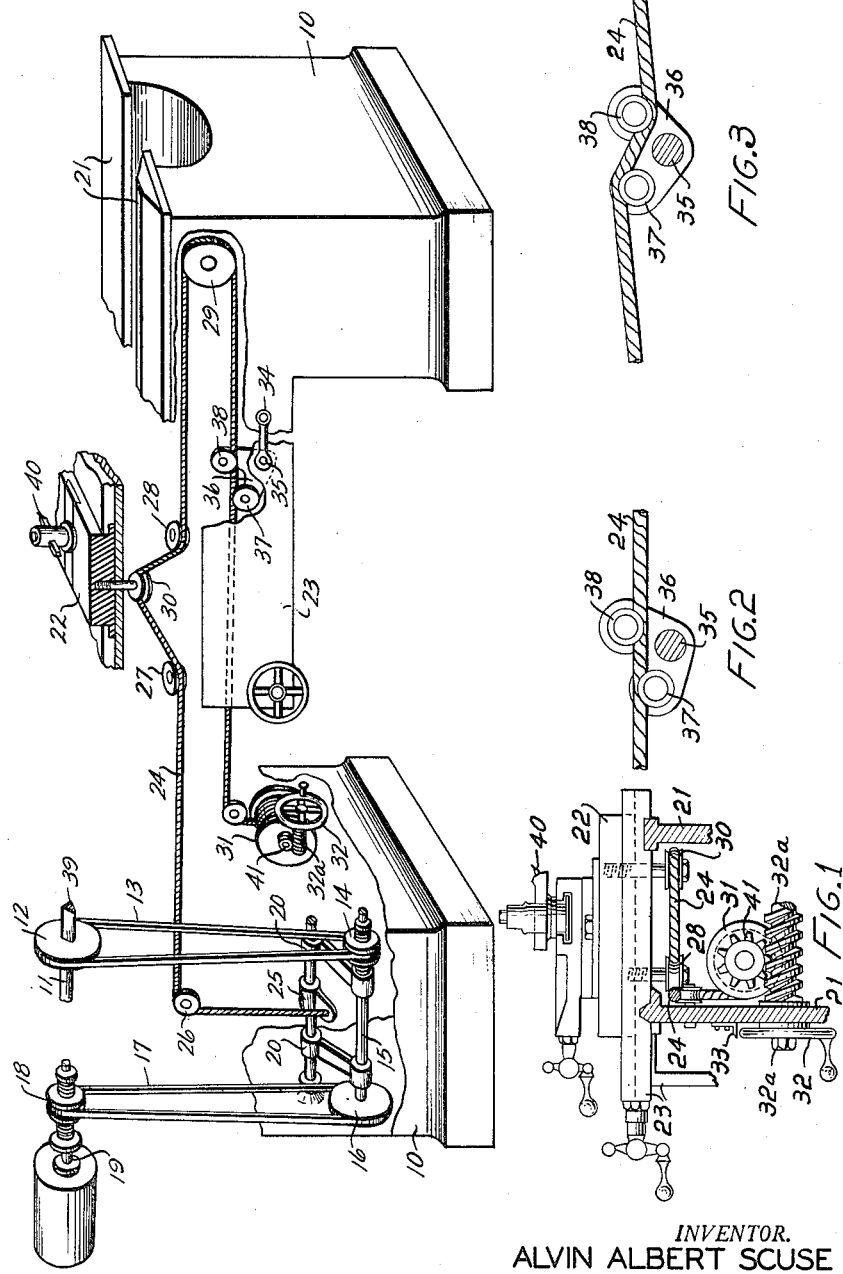
INVENTOR.
ALVIN ALBERT SCUSE
BY Charles Fiandaca Patented Feb. 5, 1946

2,394,209

UNITED STATES PATENT OFFICE 2,394,209

SPEED CONTROL FOR MACHINE TOOLS

Alvin Albert Scuse, Rochester, N. Y.

Application August 6, 1942, Serial No. 453,765

6 Claims. (Cl. 82—2)

This invention relates to control of machine tool speeds, and particularly to the maintenance of a definite cutting speed relationship between the work and cutting tool.

An object of the invention is to provide in a lathe or grinder or similar machine a variable speed control of the rotating headstock so that the speed is automatically increased or decreased respectively as the work decreases or increases in diameter while cutting.

A further object is to provide a pre-setting arrangement whereby the automatic variation of speed is easily and conveniently changed for the various alloys and materials being cut to maintain the proper surface cutting speed required by such material.

A further object is to provide an automatic variable speed control which may be easily installed in new or existing machine tools and which will not interfere with conventional operation thereof while on the machine.

A further object is to provide an automatic variable speed control for machine tools which in addition to varying the speed of the work as its diameter changes, will also serve as a quick return mechanism to return the tool for its succeeding cutting cycle.

In order to operate a machine tool such as a lathe at its peak efficiency it is desirable to maintain a constant surface cutting speed at the cutting tool and while cutting work. This is likewise desirable to obtain proper finish. Operators of lathes employing conventional stepped gearing speed changes, while cutting work which changes considerably in diameter, as for instance, in cutting-off or facing operations, feed the cutting tool faster as the center of the work is approached. This is done in order to obtain greater production, but a poor finish results due to the visible marks left by the tool. When the tool is fed at a constant rate of feed a better finish will result, but the surface cutting speed, which must be set in accordance with the large diameter of the work, will be too slow at the smaller diameters as center is approached.

As applied to a lathe, the present invention employs a variable speed device preferably of the expanding pulley type to vary the speed of the headstock of the machine, and by the use of a device directly connected with the cross-slide automatically increases the speed of the headstock as the cross-slide is fed inwardly towards the center of the work piece. In the opposite direction the speed is decreased.

In its preferred embodiment this connection consists of a flexible member such as a chain or cable, one end of which is secured to the control lever of the expanding pulley speed change device, and the other end to a pre-setting hand wheel-operated drum, intermediately of which ends, a take-up pulley connection is made with the cross-slide. This take-up connection is such that, as the cross-slide feeds inward, a pull is exerted on the cable thereby pulling the expanding pulley control lever towards its high speed position; and as the cross-slide recedes, the cable slack allows the control lever to return to its slow speed position by gravity or by a return spring, whichever type happens to be used.

The speed changing device illustrated is unique in that two expanding driving pulleys are employed. One expanding pulley being keyed to the line shaft or motor shaft, as the source of power may be, and the other expanding pulley being keyed to a reciprocating countershaft. This countershaft oscillates on its hangers and simultaneously forces the V belts, through which power is transmitted to this shaft and the headstock pulley, to force apart the V sides of the expanding pulleys. Thus, when the expanding pulley on the motor shaft and countershaft are expanded, the countershaft and headstock rotate at a slower speed due to the fact that each expanding pulley is the driving pulley on its shaft, the driven pulleys on the countershaft and headstock being non-expanding. When the expanding pulleys contract due to a lessening of tension on the countershaft, the speed of the headstock and countershaft decreases because the driving expanding pulleys have become larger in diameter.

It will be apparent that such a countershaft may be located in many positions in relation to the machine frame and can be easily attached to existing machines as well as to those newly designed for the specific device, and due to the fact that expanding pulleys are not required on the headstock shaft, this part of the machine need not be altered or disturbed.

In the drawing:

Fig. 1 is a side elevation, partly in section, of a lathe carriage and compound cross-slide showing the application of the cable to these parts.

Fig. 2 is a front elevation, partly in section, of the quick return yoke, shown in neutral position.

Fig. 3 is a front elevation of the same parts shown in Fig. 2, the yoke being swivelled into operative position to form a Z bend in the cable.

Fig. 4 is a diagrammatic representation of the interrelation of the parts of the invention as applied to a lathe which is shown broken and in section.

Referring to the drawing wherein like numerals denote like parts, the invention is illustrated as applied to a lathe designated as 10, having a headstock spindle 11 on which is keyed a non-expanding V belt pulley 12, driven by a V belt 13 from expanding pulley 14 keyed on the oscillating countershaft 15. Solid pulley 16 is also keyed to the oscillating shaft 15, and is driven by V belt 17 from expanding pulley 18 keyed on motor shaft 19 which furnishes the motive power for the machine.

The expanding pulleys 14 and 18 may be of the ordinary spring pressed wall expansion variety wherein the two inner walls between which the V belt travels are forced apart by pressure of the belt forcing or wedging itself towards the axial center of the pulley.

Thus, as oscillating shaft 15 is swivelled radially on its hangers 20 which are journaled to the lathe frame 10, in a direction away from the motor shaft 19, wedging pressure on belts 13 and 17 is increased, forcing the walls of the pulleys 14 and 18 apart as the belts wedge themselves towards the pulley centers against the reaction of the pulley springs. This separation of the pulley walls decreases their circumferential contact surface with the belts due to a decrease of contact diameter and consequently reduce the speeds of the shafts which they drive, that is, the countershaft 15 and the headstock spindle 11. Countershaft 15 is preferably positioned opposite and axially parallel to motor shaft 19 and headstock spindle 11 so that it may be simultaneously swivelled radially away from and towards the motor shaft 19 and headstock spindle 11 thereby expanding or contracting the two expansible pulleys 14 and 18 simultaneously. This arrangement provides slack-free belts at all times, maintains permanent alignment of the pulleys and full utilization of belt power. Due to the weight of this oscillating shaft, it may be allowed to return to low speed position by gravity, otherwise a spring and lever may be employed.

The automatic speed varying device operable by cross travel of the cross-slide 22 on the carriage 23 is illustrated as a normally stationary flexible cable 24 fixed at one end to the lathe bed 10 or preferably to a handwheel drum 31 as hereinafter explained, and at the other end to a lever arm 25 pinned to the oscillating countershaft 15. This cable 24 is held in axial alignment with the headstock spindle and lathe ways 21 by idler pulleys 26, 27, 28, 29, and the take-up loop is formed by looping a portion of the cable 24 around an idler pulley 30 on the cross-slide block 22. Cross travel of cross-slide 22 thus increases or decreases the size of the cable loop between pulleys 27, 30 and 28, thereby manipulating lever arm 25 due to pulling or slackening of cable 24.

The speed pre-setting arrangement is illustrated as a drum 31 journaled in the lathe frame 10, to which the other end 31a of cable 24 is fixed after being looped around idler pulley 29 at the tail stock end of the lathe. Worm shaft 32a has keyed thereon a dial handwheel 32 with calibrated headstock speed indications scribed around its periphery and which are read in conjunction with a pointer 33 secured to frame 10. Preferably a worm wheel 41 secured to drum 31 and rotated by a worm on shaft 32a is employed for positive settings of the cable drum and to permit the pre-setting of handwheel 32 and cable drum 31 at any desired headstock speed. Turning handwheel 32 in a direction to coil cable 24 on drum 31 shortens the cable 24 and consequently pulls on lever 25 thereby forcing the oscillating countershaft 15 to swivel towards the motor shaft 19, allowing the expanding pulleys 14 and 18 to contract, thereby increasing the speed of countershaft 15 and headstock spindle 11. Rotation of handwheel 32 in the opposite direction so as to unwind cable 24 from drum 31 allows return of lever 25 towards slow speed position.

The quick return mechanism is illustrated as a lever 34 attached to the apron 23 of the lathe, and having keyed to its shaft 35 a yoke 36 having idler pulleys 37, 38 at its opposite ends, and between which is threaded the cable 24. In the neutral position of lever 34, the idler pulleys straddle loosely the cable 24 so that travel of cross-slide and apron longitudinally of the lathe ways 21 does not affect cable 24. When quick-return lever 34 is in operative position it quickly returns the apron or cross-slide on which are secured idler pulleys 37 and 38. In operative position yoke 36 forms double take-up loops in cable 24 in a form resembling the letter Z, thereby quickly shortening the effective length of cable 24 and raising lever 25 of the oscillating shaft 15 to high speed position. Return of lever 34 and yoke 36 to neutral position allows return of cable 24 and lever 25 to their normal pre-set position.

Thus, a mechanism is provided wherein any desired change of speed of the headstock may be obtained by slow increments with the pre-setting handwheel 32 or by a fast change with the lever 34, in addition to the automatic change effected by the cross-slide.

The motor shaft 19 has been shown radially of the countershaft 15 on the same side thereof as is the headstock spindle 11. This position of the motor shaft provides a more uniform change of speed by concurrent expansion of pulleys 14 and 18 than when the motor shaft 19 is radially opposite countershaft 15 and headstock spindle 11, in which latter arrangement differential expansion of pulleys 14 and 18 would yield a more abrupt change of speed, for in such case one pulley would be contracting during expansion of the other.

In operation of the machine the dial of handwheel 32 is set at the pointer 33 to the speed range required of the diameter and alloy content of the work piece in the chuck of the headstock 11, thereby coiling or uncoiling cable 24 on shaft 31 and actuating lever 25 to bring countershaft 15 towards or away from motor shaft 19 at which position the pulleys 14 and 18 yield the speed of headstock desired. The motor shaft 19 with expanding pulley 18 then is set in motion, driving belt 17 and solid pulley 16 on countershaft 15. Expanding pulley 14 thereupon drives solid pulley 12 through V belt 13. Power from this pulley is then applied to headstock spindle 11 either directly or through the back-gearing train usually present on lathes headstocks, and the work-piece 39 is in rotation. Through the usual apron and cross-slide gearing from the headstock, feed of the tool 40 is set in motion. While tool 40 is fed by the carriage 23 longitudinally parallel with the ways 21 of the lathe, that is, axially of the headstock spindle 11, cable 24 is stationary at both ends, the pulleys 27, 28, and 30 acting as idlers to maintain a constant loop in cable 24 and a constant speed of the work piece 39. When, however, the cross-slide 22 is fed forward as in cutting a taper or necking or facing, or cutting off, the V loop in cable 24 formed by pulleys 27, 30, and 28 is enlarged by the travel of pulley 30 away from idler pulleys 27 and 28. In so doing, a pull is exerted on the ends of cable 24 which causes lever 25 (being the only end of the cable 24 which can yield) to move in an arc, forcing countershaft 15 towards motor shaft 19, thereby allowing expanding pulleys 14 and 18 to contract and become larger, increasing the speed of the headstock pulley 12, and of the work piece 39.

As cross-slide 22 is retracted away from the work center, the speed of the work 39 decreases. This takes place on reverse movement of lever 25 and countershaft 15 due to a diminution of the V loop of cable 24 permitted by recession of pulley 30 on the cross-slide 22. Speed of the headstock may likewise be increased on the return movement of the cross-slide 22 to effectuate a quick return of the tool during its non-cutting return movement by moving lever 34 to its effective position so that yoke 36 forms a Z bend in cable 24. This Z bend shortens and pulls on the left end of the cable 24 thereby actuating lever 25 and quickly bringing it to high speed position.

In adjusting the cable so as to render the cross-slide automatic speed changes effective even when the handwheel 31 has been adjusted at its extreme settings, movement of lever 25 on the countershaft is preferably divided so that a portion of its movement in one direction is effectuated by the handwheel shaft 31 and the remaining movement by the cross-slide pulley 30.

It is obvious that the speed control described may be used in many types of machines and with other speed varying devices. While the invention has been shown in its preferred embodiment it is contemplated that changes and variations therein may be made without departing from the spirit or scope thereof as claimed.

What is claimed is:

1. In combination with a machine of the class described, provided with a work holding headstock, a tool holding cross-slide in predetermined ratio-driven relationship therewith, and an oscillating countershaft in driving relationship to said headstock, means for varying the speed thereof and comprising an expanding pulley mounted on the power driving shaft driving said countershaft, an additional expanding pulley and a solid pulley on said countershaft, a V belt drive connection from the expanding pulley on the countershaft to a solid pulley on the headstock, and from the expanding power shaft pulley to the solid countershaft pulley, a flexible connector anchored at one end to said oscillating shaft and at the other end to a manually operable indicating windlass-like shaft, whereby rotation of said shaft in windlass fashion oscillates said oscillating countershaft to expand or contract said expanding pulleys for changing the speed of said headstock.

2. In combination with a machine of the class described, provided with a work holding headstock, a tool holding cross-slide, and a lever operated oscillating countershaft, means for progressively varying the speed of the headstock by movement of the cross-slide radially of the headstock, and comprising an expansible pulley mounted on the power driving shaft driving said countershaft, an additional expansible pulley and a solid pulley on said countershaft, a V belt drive connection between the power shaft expansible pulley and countershaft solid pulley, another V belt drive connection between said countershaft expansible pulley and a solid pulley driving the headstock, a flexible connector anchored at one end to the oscillating lever of said countershaft and to the machine frame at the other end and looped about a set of pulleys on the cross-slide so as to form at said cross-slide a take-up connection whereby movement of said cross-slide radially toward the axial center of said headstock oscillates said countershaft to contract said expansible pulleys and increase the speed of said headstock.

3. In a machine of the class described, the combination including a headstock and cross-slide in predetermined ratio-driven relationship, means for progressively varying the headstock speed and additional means for pre-setting a range of headstock speeds, said latter means comprising a flexible member attached at one end to the control lever of a variable speed device and extended parallel to the headstock and operative length of the ways, a portion of said flexible member being perpendicularly looped about a pulley member on the cross-slide, and said flexible member being extended about an idler pulley at the tail stock end of the machine and returned parallel to the ways to a handwheel operated shaft and secured thereto whereby turning of the handwheel of the shaft pre-selects a range of said speeds in accordance with the length of the flexible member coiled thereon.

4. In a machine tool, the combination of a work holder and variable speed driving means therefor, a tool holder moveable relatively to the work holder and driving means therefor, automatic means effective upon movement of the tool holder to vary the speed of the work holder and tool holder in predetermined ratio, said automatic means comprising a flexible take-up connection between said tool holder and the speed varying control of said work driving means, and a speed pre-setting device incorporated in said automatic speed changing means, comprising a manually rotatable drum secured to one end of said flexible take-up connection upon which said flexible connector may be wound to effect a speed change of said work driver independently of the movement of said tool holder.

5. In a machine tool, the combination having a work holder and variable speed driving means therefor, a tool holder relatively moveable to the work holder and driving means therefor, automatic means effective upon movement of the tool holder to vary the speed of the work holder drive to maintain a substantially constant surface speed of the work at the cutting surface of the tool, said automatic means comprising a flexible take-up connection between said tool holder and the speed varying control of said work driving means; and a speed pre-setting device incorporated into said automatic speed changing means comprising a manually rotatable drum secured to one end of said flexible take-up connection upon which said flexible connector may be wound to effect a speed change of said work driver independently of the movement of said tool holder.

6. In a machine of the class described, the combination including a headstock and cross-slide in predetermined ratio-driven relationship, means for progressively varying the headstock speed and additional means for presetting a range of headstock speeds, said latter means comprising a flexible member attached at one end to the control lever of a variable speed device and extended parallel to the headstock and operative length of the ways of the machine over a portion of its length, another portion of said flexible member being perpendicularly looped about a pulley member on the cross-slide, and said flexible member being extended about an idler pulley at the tailstock end of the machine and returned along the ways to a handwheel operated shaft and secured thereto, whereby turning of the handwheel of the shaft pre-selects a range of speeds of the headstock in accordance with the length of flexible member coiled thereon, and additional quick speed changing means comprising a lever actuated yoke secured to the machine and straddling the flexible member and adapted to bend said flexible member in Z fashion when in operative position.

ALVIN ALBERT SCUSE.